(12) United States Patent
Martin et al.

(10) Patent No.: US 7,548,418 B2
(45) Date of Patent: Jun. 16, 2009

(54) DATA STORAGE CARTRIDGE WITH NON-TAPE STORAGE MEDIUM AND ELECTRICAL TARGETS

(75) Inventors: Robert C. Martin, St. Paul, MN (US); Gregory H. Johnson, Oakdale, MN (US); G. Phillip Rambosek, Shafer, MN (US); Leo W. Spychalla, Cottage Grove, MN (US)

(73) Assignee: Imation Corp., Oakdale, MN (US)

( * ) Notice: Subject to any disclaimer, the term of this patent is extended or adjusted under 35 U.S.C. 154(b) by 274 days.

(21) Appl. No.: 11/502,254

(22) Filed: Aug. 9, 2006

(65) Prior Publication Data

US 2008/0037211 A1 Feb. 14, 2008

(51) Int. Cl.
*G06F 1/16* (2006.01)
(52) U.S. Cl. .......................... 361/679.37; 361/679.33; 361/679.39
(58) Field of Classification Search ................. 361/685, 361/679.33, 679.37, 679.39
See application file for complete search history.

(56) References Cited

U.S. PATENT DOCUMENTS

| 5,281,150 | A | * | 1/1994 | Bundga et al. ................ 439/67 |
| 5,420,733 | A |   | 5/1995 | Knighton et al. |
| 5,886,869 | A |   | 3/1999 | Fussell et al. |
| 6,442,022 | B1 | * | 8/2002 | Paul ............................ 361/685 |
| 6,494,749 | B1 | * | 12/2002 | Chang ......................... 439/701 |
| 6,563,714 | B2 | * | 5/2003 | Chang ......................... 361/752 |
| 6,648,695 | B1 | * | 11/2003 | Wu ............................. 439/638 |
| 6,722,897 | B1 |   | 4/2004 | Wu |
| 6,761,580 | B2 | * | 7/2004 | Chang ......................... 439/502 |
| 6,819,524 | B2 |   | 11/2004 | Kulakowski et al. |
| 6,867,942 | B2 |   | 3/2005 | Albrecht et al. |
| 7,360,713 | B2 | * | 4/2008 | Nishizawa et al. ........... 235/492 |
| 2004/0023522 | A1 | * | 2/2004 | Chang ......................... 439/43 |
| 2004/0032711 | A1 | * | 2/2004 | Kaczeus et al. .............. 361/685 |
| 2004/0097122 | A1 |   | 5/2004 | Garrett et al. |
| 2005/0117249 | A1 | * | 6/2005 | Spychalla ................. 360/98.04 |
| 2006/0044674 | A1 |   | 3/2006 | Martin et al. |
| 2006/0208091 | A1 | * | 9/2006 | Nishizawa et al. ........... 235/492 |
| 2008/0149739 | A1 | * | 6/2008 | Nishizawa et al. ........... 235/492 |

FOREIGN PATENT DOCUMENTS

GB 2 279 816 1/1995

* cited by examiner

*Primary Examiner*—Jayprakash N Gandhi
*Assistant Examiner*—Adrian S Wilson
(74) *Attorney, Agent, or Firm*—Eric D. Levinson (57) ABSTRACT

A data storage cartridge includes housing, a hard drive, and a connection assembly. The hard drive is stored within the housing and includes a non-tape storage medium and an electrical data connector configured to provide access to the non-tape storage medium. The electrical data connector includes a first number of connection terminals. The connection assembly is positioned within the housing and is coupled with each of the connection terminals of the electrical data connector. The connection assembly includes a second number of electrical targets spaced from and in electrical communication with the electrical data connector wherein the first number is greater than the second number. The electrical targets provide an interface for externally accessing the storage medium via the connection assembly and the electrical data connector.

25 Claims, 7 Drawing Sheets

DATA STORAGE CARTRIDGE WITH NON-TAPE STORAGE MEDIUM AND ELECTRICAL TARGETS

FIELD OF INVENTION

The present invention generally relates to a data storage cartridge. More particularly, the present invention relates to a data storage cartridge including hard drive storage and presenting customized electrical connection targets.

BACKGROUND

Data storage cartridges have been used for decades in the computer, audio, and video fields as means for storing data files. Data storage cartridges utilizing magnetic storage tapes continue to be a popular form of recording large volumes of information for subsequent retrieval and use, particularly in an automated library setting. Although conventional, automated libraries using data storage tape cartridges provide access to vast amounts of information, data storage tape cartridges prevent true random access to files stored in the data storage tape cartridges. In particular, a conventional data storage tape cartridge consists of a magnetic storage tape (i.e., an elongated flexible medium having a magnetic recording layer) wound on one or more wheels or hubs.

Data is recorded and retrieved from the magnetic storage tape by inserting the data storage tape cartridge within the tape drive and passing the storage tape in front of one or more read/write heads. The tape drives are usually streaming devices in which data is recorded in a serpentine fashion as the storage tape streams back and forth across the read/write heads. In particular, the tape drive typically writes the data along a number of tracks that span the length of the storage tape. For this reason, data storage tape cartridges can be viewed as sequentially storing data in a linear format. The linear data storage format does not provide true random access to individual files. In particular, a tape drive must scan through the entire length of the storage tape until the appropriate file mark is identified on the storage tape, which increases the file retrieval time.

Due to the lack of true random access to individual files stored within the data storage tape cartridges and the affinity for pre-existing automated, data storage tape cartridge library systems, data storage cartridges utilizing non-tape forms of data recording media have developed as a data storage alternative. In particular, data storage tape cartridges using hard disk drive data storage have increased in availability and popularity. While data storage cartridges using hard disk drives provide for true random access to data stored therein, the typical electrical connectors of hard disk drives are not configured to withstand the plurality of connection and disconnection cycles typical for data storage cartridges used in automated data storage libraries.

For example, hard disk drives typically include a Serial Advanced Technology Attachment (SATA) connector having a plurality of connection terminals. A device, such as a read/write dock, is typically mated with the hard disk drive by frictionally sliding dock connection pins over a surface of each of the plurality of connection terminals. Repeated siding of the connection pins over the connection terminals continually scrapes away and degrades the conductive plating on the connection terminal, thereby, gradually disintegrating the integrity of the resultant electrical connection. Furthermore, typical SATA connectors generally require precise alignment with connection pins of a docking device, which further complicates the design of data storage cartridges and docking devices used in automated systems.

For at least the above reasons, it would be desirable to form a more robust electrical connection between a non-tape data storage cartridge and an associated read and/or write cartridge dock or other host system that is capable of maintaining electrical integrity through a plurality of connection and disconnection cycles.

SUMMARY

One aspect of the present invention relates to a data storage cartridge including housing, a hard drive, and a connection assembly. The hard drive is stored within the housing and includes a non-tape storage medium and an electrical data connector configured to provide access to the non-tape storage medium. The electrical data connector includes a first number of connection terminals. The connection assembly is positioned within the housing and is coupled with each of the connection terminals of the electrical data connector. The connection assembly includes a second number of electrical targets spaced from and in electrical communication with the electrical data connector wherein the first number is greater than the second number. The electrical targets provide an interface for externally accessing the storage medium via the connection assembly and the electrical data connector.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," etc., is used with reference to the orientation of the Figure(s) being described. Because components of embodiments described herein can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The embodiments described herein relate to a data storage cartridge and an automated library system or other host system for use with a data storage cartridge having customized electrical connection targets. For example, the data storage cartridge includes a hard drive and a connection assembly. The connection assembly is electrically coupled with the hard drive and defines a plurality of electrical connection targets each selected, sized, shaped, spaced, and otherwise designed according to mechanical and electrical tolerances for interaction between the data storage cartridge and the associated host system. The design of the targets permits more reliable and repeatable electrical contact between the data storage cartridge and the host system. In addition, the electrical connection targets are configured for compliant and transverse contact by the host system, thereby, resulting in decreased degradation of the electrical connection formed therebetween as compared to the electrical couplings used with typical non-tape data storage cartridges.

Figure 1:
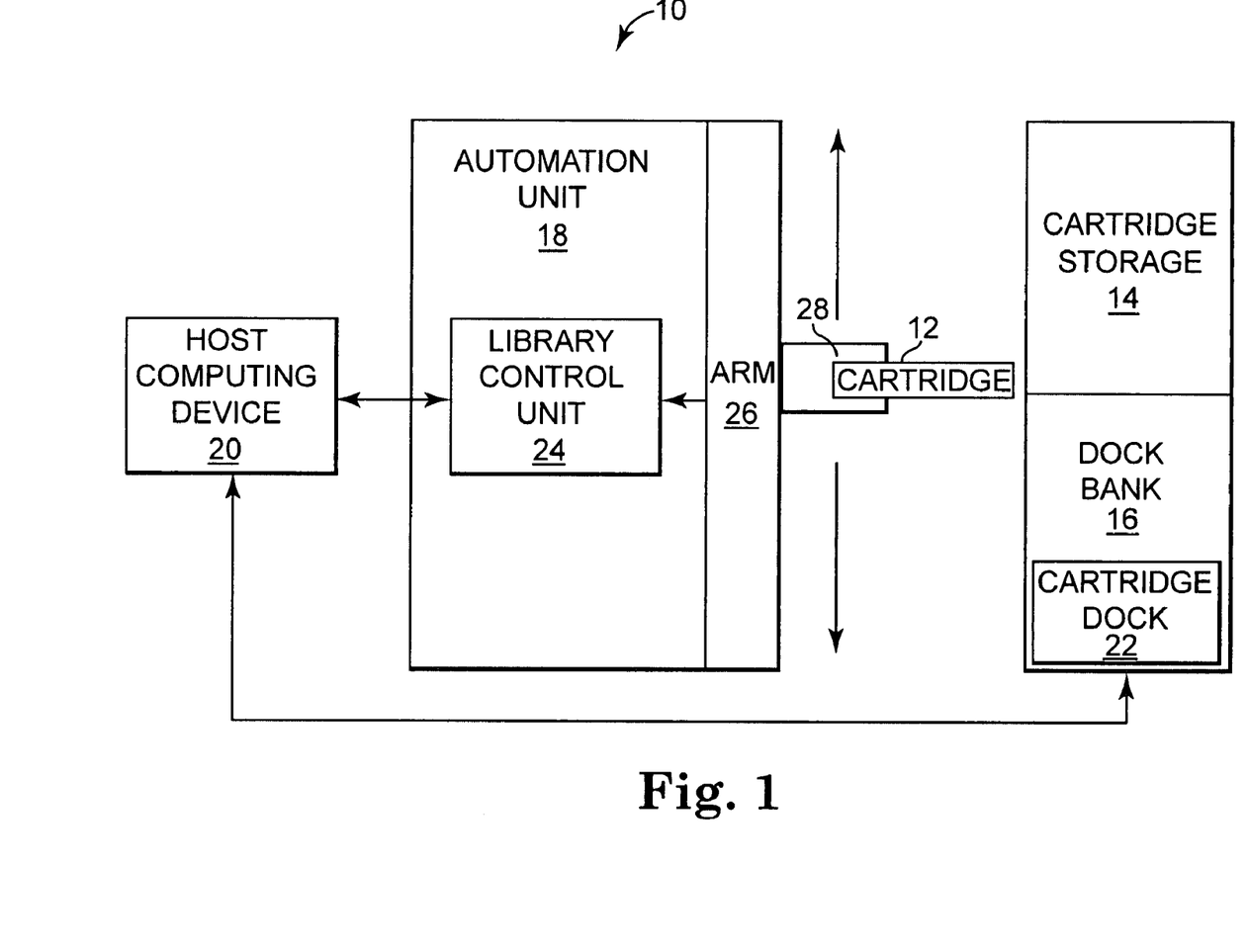
FIG. 1 is a block diagram of one embodiment of an automated library system.

One embodiment of an automated library system 10 utilizing at least one data storage cartridge 12 according to one example of the present invention is generally illustrated in FIG. 1. The automated library system 10 includes a cartridge storage unit 14, a dock bank 16, an automation unit 18, and a host computing device 20. The cartridge storage unit 14 is configured to store a plurality of data storage cartridges 12, and the dock bank 16 includes a plurality of cartridge docks 22 configured to selectively receive, read data from, and write data to the data storage cartridges 12. Generally, during use, the host computing device 20 signals the automation unit 18 to retrieve a particular data storage cartridge 12 from the cartridge storage unit 14. The automation unit 18 removes a particular data storage cartridge 12 from the cartridge storage unit 14 and inserts the data storage cartridge 12 into one of the cartridge docks 22 of the dock bank 16.

When the data storage cartridge 12 is in the cartridge dock 22, the host computing device 20 accesses the data storage cartridge 12 to read from and/or write to the data storage cartridge 12. Upon completion of reading from/or writing to the data storage cartridge 12, the host computing device 20 signals the automation unit 18, and the automation unit 18 returns the particular data storage cartridge 12 to the cartridge storage unit 14. As such, the data storage cartridges 12 in the automated library system 10 undergo a number of connection and disconnection cycles with the cartridge dock 22.

The cartridge storage unit 14 provides a plurality of storage locations (not illustrated) for data storage cartridges 12. Each storage location, also referred to as a storage cell, provides storage for a single data storage cartridge 12 and each data storage cartridge 12 has an assigned storage location within the cartridge storage unit 14. In addition, each of the data storage cartridges 12 stored in the cartridge storage unit 14 can include identifying information, such as a label, a bar code, or a a radio frequency (RF) tag, commonly referred to as a radio frequency identification (RFID) tags, by which the automation unit 18 identifies the individual data storage cartridges 12.

The dock bank 16 includes at least one and preferably a plurality of dock locations (not illustrated). Each of the dock locations is adapted to receive a cartridge dock 22 configured to read from and/or write to a storage medium housed within the data storage cartridge 12. More specifically, each cartridge dock reads from or writes to each data storage cartridge 12 based on instructions received from the host computing device 20.

The automation unit 18 facilitates selective movement of the data storage cartridges 12 between the cartridge storage unit 14 and the dock bank 16. The automation unit 18 includes a library control unit 24 and robotic arm 26. The library control unit 24 is configured to receive instruction and direction from the host computing device 20 and to generate signals to activate the automation unit 18 in accordance with the instructions received. In particular, the library control unit 24 interprets storage access requests from the host computing device 20 and provides signals to control the motion and operation of the robotic arm 26.

The robotic arm 26 typically includes a gripper 28 to facilitate secure handling of the data storage cartridges 12. The host computing device 20 is any computer system configured to relay access signals from a user (not illustrated) to the automation unit 18 and to read from and write to the data storage cartridges 12 via the cartridge dock 22 contained within the dock bank 16.

During use, in response to communication signals from the host computing device 20, the library control unit 24 generates control signals directing the robotic arm 26 to retrieve the appropriate data storage cartridge 12 from the cartridge storage unit 14 and to insert the data storage cartridge 12 into one of the cartridge docks 22 in the dock bank 16. In response to the signals from the library control unit 24, the robotic arm 26 traverses the cartridge storage unit 14 and engages the particular data storage cartridge 12 using the gripper 28. The robotic arm 26 then moves the data storage cartridge 12 to the dock bank 16 to insert the data storage cartridge 12 into one of the cartridge docks 22.

Upon insertion of the data storage cartridge 12 into one of the cartridge docks 22, the host computing device 20 can write data to and/or read data from the data storage cartridge 12. Subsequently, the robotic arm 26 removes the data storage cartridge 12 from the cartridge dock 22 and replaces the data storage cartridge 12 back in the appropriate assigned position within the cartridge storage unit 14.

Although an automated library system 10 is described above, in one embodiment, the data storage cartridge 12 is used with an individual or stand alone cartridge dock 22. In other embodiments, other connectors connected directly to a computer processing unit or otherwise included in a host system are also able to be connecting with an individual data storage cartridge 12 for use of the data storage cartridge 12 as directed by a user or other host device (not illustrated).

Figure 2:
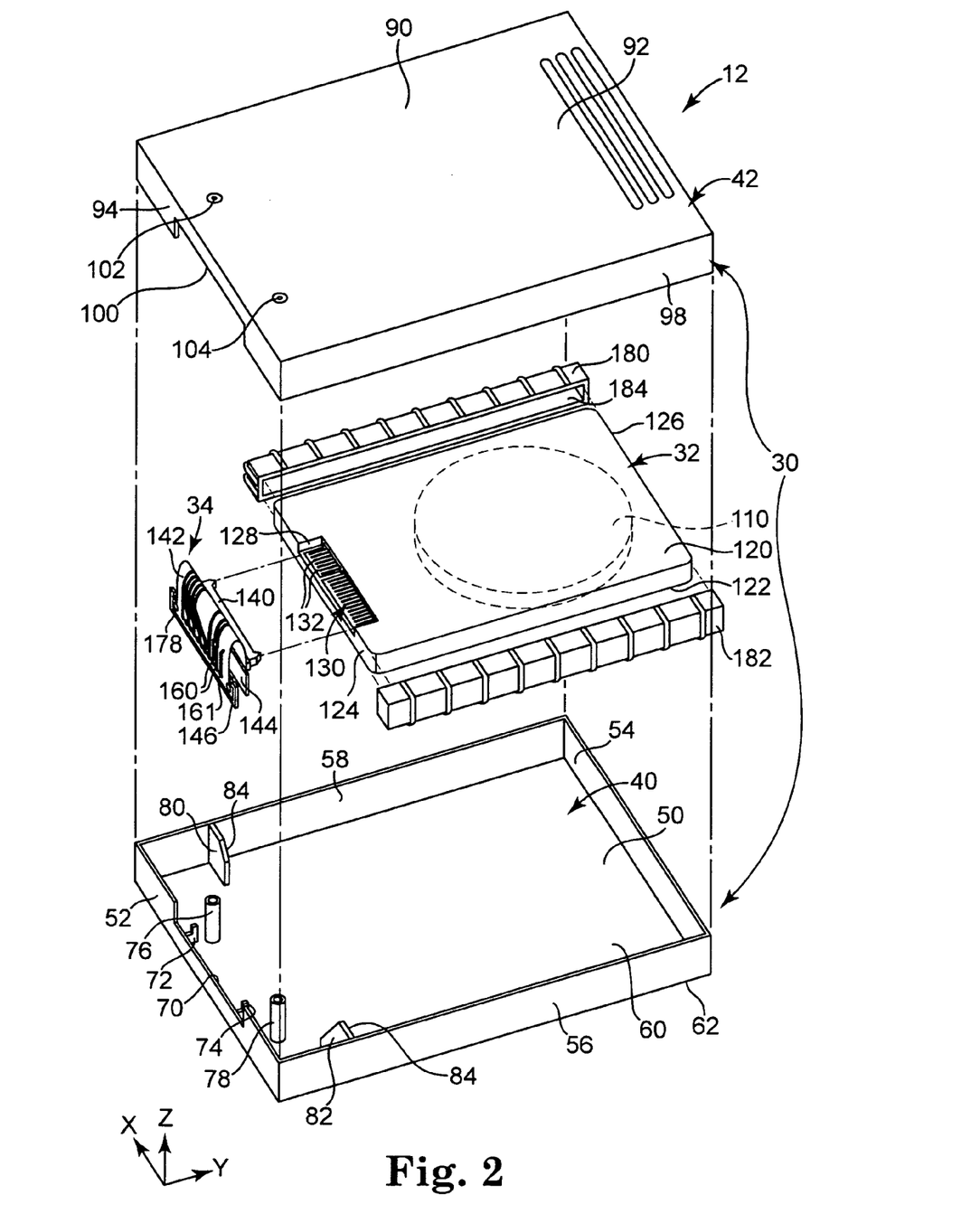
FIG. 2 is a perspective, exploded view of one embodiment of a non-tape data storage cartridge.

One embodiment of the data storage cartridge 12 is more particularly illustrated in FIG. 2. The data storage cartridge 12 includes a housing 30, a hard drive 32, and a connection assembly 34. The housing 30 includes a first housing member 40 and a second housing member 42 sized to collectively receive and substantially enclose the hard drive 32. In one embodiment, the first housing member 40 serves as a base whereas the second housing member 42 serves as the cover. It should be understood that terminology such as "cover" and "base" are used for illustrative purposes only and do not refer to a particular positional orientation of the housing 30.

The base 40 defines a major portion 50, a leading wall 52, a trailing wall 54 opposite the leading wall 52, a first side wall 56, and a second side wall 58 opposite the first side wall 56. The major portion 50 is substantially rectangular and substantially planar. As such, the major portion 50 defines an interior surface 60 and an exterior surface 62 (generally indicated in FIG. 2) opposite the interior surface 60. The walls 52, 54, 56, and 58 each extend from the interior surface 60 of the major portion 50 in a direction opposite the exterior surface 62. In particular, the trailing wall 54 extends from the major portion 50 between side walls 56 and 58. Similarly, leading wall 52 extends from the major portion 50 between the side walls 56 and 58.

In one embodiment, the leading wall 52 defines an indentation or cut-out 70 extending from an edge of the leading wall 52 opposite and toward the major portion 50. In one example, the cut-out 70 is longitudinally centered along the leading wall 52 between side walls 56 and 58. Near each end of the cut-out 70, a support tab 72 or 74 extends from the major portion 50 and the leading wall 52. In one embodiment, each support tab 72 and 74 defines a stepped surface opposite the major portion 50 and configured to facilitate attachment and coupling with the connection assembly 34 as will be further described below. In one example, a cylindrical body 76 or 78 extends from the major portion 50 near each of the support tabs 72 and 74 in a direction substantially parallel to the extension of side walls 56 and 58. Each cylindrical body 76 and 78 is substantially hollow and, in one embodiment, is internally threaded or otherwise configured to receive a housing connection device (not illustrated), such as a screw, rivet, etc. In one embodiment, the cover 42 rather than the base 40 includes cylindrical bodies 76 and 78.

In one example, stop flanges 80 and 82 or other suitable stops are also included in the interior portion of the base 40. In particular, the first stop flange 80 extends from the interior surface 60 of the major portion 50 near the first side wall 56 toward the second side wall 58. The second stop flange 82 extends from the interior surface 60 of the major portion 50 and the second side wall 58 toward the first side wall 56. Stop flanges 80 and 82 each define at least one stop surface 84 extending substantially parallel to the leading and trailing walls 52 and 54 and facing the trailing wall 54.

The cover 42 is generally sized similar to the base 40. Accordingly, the cover 42 includes a major portion 90, which is substantially rectangular and substantially planar, defining an exterior surface 92 and an interior surface (not illustrated) opposite the exterior surface 92. The cover 42 further defines a leading wall 94, a trailing wall 96 (FIG. 6) opposite the leading wall 94, a first side wall 98, and a second side wall (not illustrated) each extending from the major portion 90 opposite the exterior surface 92. As such, the leading wall 94, the trailing wall 96, the first side wall 98, and the second side wall collectively extend about a perimeter of the major portion 90 of cover 42 in a manner similar to the extension of walls 52, 54, 56, and 58 around major portion 50 of base 40. In particular, the trailing wall 96 is positioned opposite the leading wall 94, and the first side wall 98 and second side wall each extend between the leading wall 94 and the trailing wall 96 opposite one another.

In one embodiment, the leading wall 94 includes an indentation or cut-out 100 similar to the cut-out 70 of base 40. In particular, the cut-out 100 extends from an edge opposite and toward major portion 90. Cut-out 100 is substantially centered on the leading wall 94 between the first side walls 98 and the second side wall (not illustrated). Notably, in other embodiments, the cut-out 100 may be otherwise positioned along leading wall 94 or any other of the walls as will be apparent to those of ordinary skill in the art.

In one example, the major portion 90 of cover 42 defines two apertures 102 and 104 extending therethrough. Each aperture 102 and 104 is spaced from one another, and apertures 102 and 104 are collectively, substantially centered between the first side wall 98 and the second side wall (not illustrated). In one example, the apertures 102 and 104 of the cover 42 are configured to align with the cylindrical bodies 76 and 78 of the base 40 upon assembly of the housing 30. In one embodiment, the base includes apertures 102 and 104, and the cover 42 includes the cylindrical bodies 76 and 78. In addition, the cut-out 100 is configured to align with the cut-out 70 of the base 40 when the housing 30 is assembled, as will be described below.

In one embodiment, the cover 42 includes similar internal features as illustrated and described for the base 40, such as, for example, features similar to the support tabs 72 and 74 and/or the stop flanges 80 and 82. Other variations in the features defined by the base 40 and cover 42 will be apparent to those of skill in the art. In one embodiment, the base 40 and the cover 42 are each formed of a polymeric material. In one embodiment, the base 40 and the cover 42 are each formed by injection molding a suitable material such as polycarbonate, etc. Alternatively, other materials and/or manufacturing techniques can be employed to form the base 40 and the cover 42. Further, it will be apparent to one of skill in the art that vents, handling features, etc., may be added to the base 40 and/or to the cover 42 to promote cooling of the hard drive 32, handling of the data storage cartridge 12, etc.

As illustrated in FIG. 2, the hard drive 32 is generally rectangular in shape and is sized to fit within housing 30, more particularly, between the base 40 and the cover 42. As described above, the hard drive 32 includes a non-tape storage medium generally indicated in FIG. 2 at 110, which may take the form of or include one or more of a variety of storage media such as a disk-shaped magnetic storage medium, a solid-state storage medium, an optical storage medium, a magneto-optical storage medium, and a holographic storage medium. The solid state storage medium may be any non-volatile memory such as a erasable programmable read-only memory (EPROM), an electrically erasable programmable memories (FLASH) memory or the like. In a preferred embodiment, the non-tape data storage medium is a random access storage medium.

In one embodiment, the hard drive 32 further defines a first surface 120 a second surface 122 opposite the first surface 120, a leading side wall 124 and a trailing side wall 126 opposite the leading side wall 124. The leading and trailing side walls 124 and 126 each extend between the surfaces 120 and 122. A generally elongated and rectangular cavity 128 is formed from and through the first side wall 124 to and through the first surface 120. The hard drive 32 includes an electrical data connector 130 within the cavity 128 and configured to provide electronic access to the information stored within the hard drive 32. In one embodiment, the electrical data connector 130 is a Serial Advanced Technology Attachment (SATA) connector. Accordingly, the connector 130 includes a plurality of connection terminals 132, such as connection pads or pins, extending generally perpendicular to the side walls 124 and 126 and laterally spaced from one another. Each connection terminal 132 is substantially elongated and extends from within the hard drive 32 into the cavity 128.

Each connection terminal 132 is plated with a conductive material, such as gold, beryllium, copper, tool steel, etc. In one embodiment, each connection terminal 132 relates to one of ground, power, or data signals. In one embodiment, the electrical data connector 130 is a typical SATA connector including a total of twenty-two connection terminals 132 divided into a signal bay of seven connection terminals 132 laterally spaced from a power bay of fifteen connection terminals 132 as known by those of skill in the art.

The connection assembly 34 is more clearly described with reference to FIGS. 3 and 4. In one embodiment, the connection assembly 34 includes a connection receptacle 140, a flexible circuit 142, a receptacle support substrate 144, and a target support substrate 146. The connection port or receptacle 140 is adapted to mechanically and electrically interface with the electrical data connector 130 of the hard drive 32. Accordingly, in one example, the connection receptacle 140 includes a SATA connector interface.

More particularly, in one embodiment, the connection receptacle 140 includes a housing 150 defining one or more cavities 152 open to a front portion of the housing 150. A plurality of pins or pads 154 (FIG. 3) are housed within the one or more cavities 152 and are each configured to interface with one of the connection terminals 132 of the hard drive 32 (FIG. 1). The connection receptacle 140 is configured to route power to and signals to and from the hard drive 32 through the pins 154 to an opposite portion of the connection receptacle 140 that interfaces with the flexible circuit 142. In one embodiment, the pins 154 are configured to slidably interface with the connection terminals 132 in a manner typical for SATA connections. For example, the connection receptacle 140 defines two separate bays of pins 154 including a power bay 166 and a data signal bay 168 configured to respectively interface with a power bay and a data signal bay of the hard drive electrical data connector 130. Use of other connection receptacles is also contemplated depending upon the particular electrical data connector 130 of the hard drive 32.

The flexible circuit 142 is any available flexible assembly for conducting electrical signals. In one embodiment, the flexible circuit 142 includes a thin and flexible base film 156 with conductive traces 158 formed of copper, gold, beryllium, etc., layered on or embedded near to one or both sides of the base film 156. In one embodiment, the base film 156 is formed of a polyimide, a polyester, or other suitable dielectric material. The flexible circuit 142 defines a first end 162 and a second end 164 generally opposite the first end 162. The first end 162 is mechanically coupled to and in electrical communication with the connection receptacle 140. In general, the traces 158 extend from first end 162, where the traces 158 are in electrical communication with the pins 154 of the connection receptacle 140, toward the second end 164 where each of the traces 158 terminates at a conductive, electrical connection target 160, such as a target pad. Each target 160 is in electrical communication with one or more of receptacle pins 154 via one or more of traces 158 and is formed of a conductive material mounted on the base film 156. As illustrated, in one embodiment, two or more of the traces 158 are positioned in close proximity to one another such that interferences acting on the two closely spaced traces 158 are similar. In this manner, the known twisted pair configuration of a SATA connection is simulated.

In one embodiment, an additional ground target 161 is defined by the flexible circuit 142 that is characterized as not being in electrical communication with the receptacle 140, but rather serves as a ground connection. Ground target 161 is configured for use in positioning and interfacing the data storage cartridge 12 with a corresponding one of the cartridge docks 22 as will be further described below. In one embodiment, the ground target 161 is formed similar to the other targets 160 as described below.

In one embodiment, the targets 160 are solid, substantially flat pads sized and shaped in accordance with tolerances and aspect ratios of the data storage cartridge 12. In particular, where the electrical data connector 130 is a standard SATA connector, the electrical data connector has a redundancy of connection points providing ground and power connections in typical interfaces with a host system to connect the ground and power in stages. However, as will be further described below, the targets 160 are configured to be transversely contacted as opposed to the slidable connection of SATA connectors.

In one embodiment, a one-to-one ratio of the number of connection terminals 132 of the hard drive 32 to the number of targets 160 of the connection assembly 34 is unnecessary due to the configuration of the interface between the cartridge dock 22 and the data storage cartridge 12 as will be further described below. As such, the number of targets 160 may be less than the number of connection terminals 132. For instance, in one embodiment wherein the electrical data connector 130 is a SATA connector with twenty-two connection terminals 132, less than twenty-two targets 160 are included in the connection assembly 34. In one embodiment, fifteen or less targets 160 are included in the connection assembly 34. In one example, ten or less targets 160 are included in the connection assembly 34. By decreasing the number of targets 160, the cost and complexity of the flexible circuit 142 is lessened and more room is available on the flexible circuit 142. The additional space available on the flexible circuit 142 further allows the targets 160 coupled thereto to be customized as desired.

Figure 3:
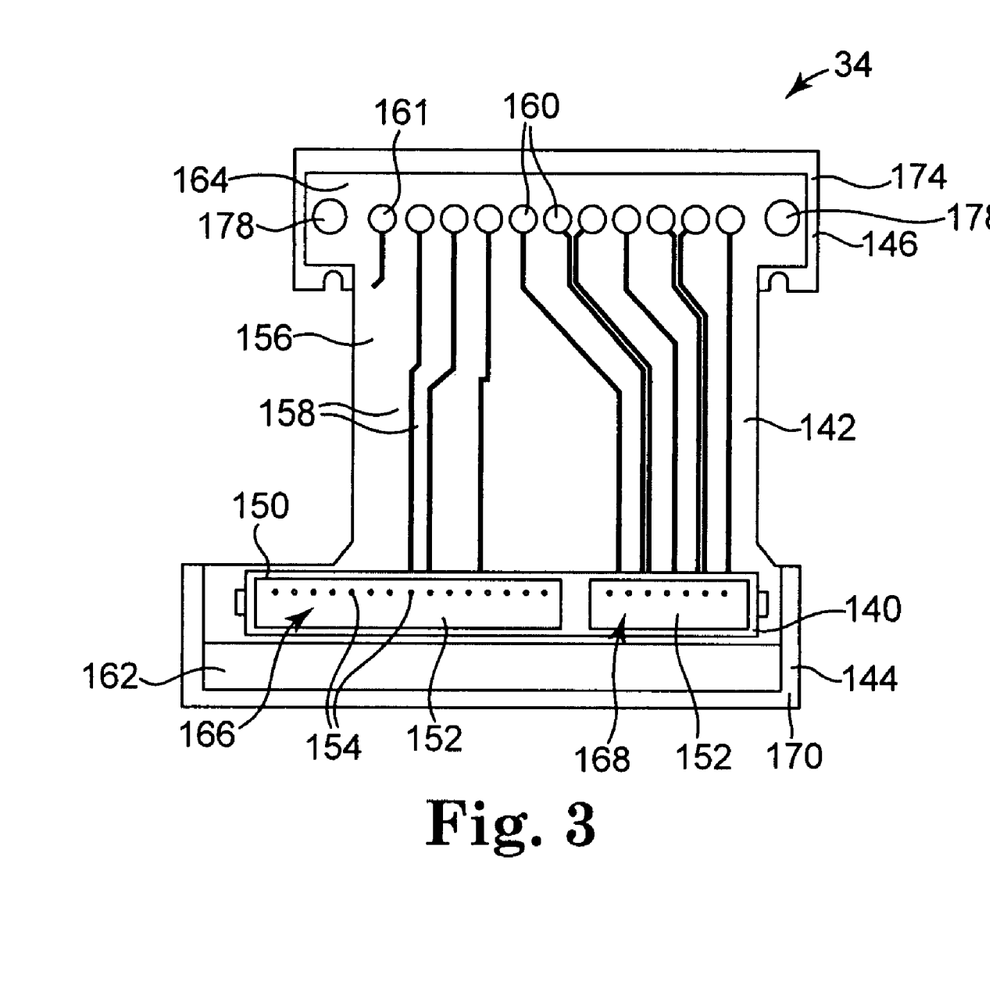
FIG. 3 is a front view illustration of one embodiment of a connector including in the data storage cartridge of FIG. 2.
Figure 4:
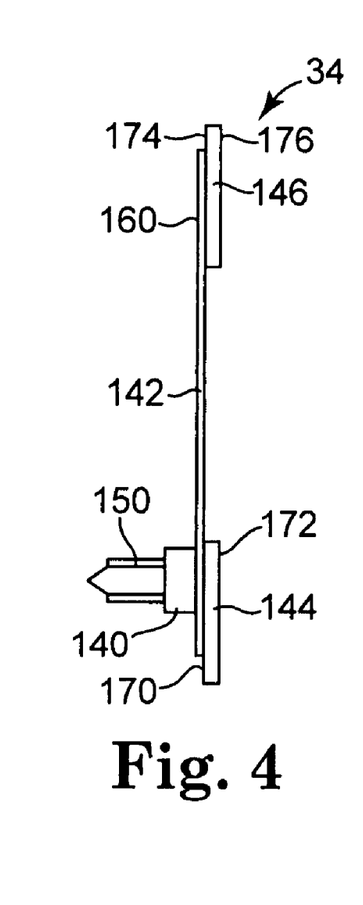
FIG. 4 is a side view illustration of the connector of FIG. 3.

In one example, where ten targets 160 are included as illustrated in FIG. 3, seven of the ten targets 160 are electrically coupled to pins 154 in the signal bay 168 while only three of the targets 160 are electrically coupled to the pins 154 of the power bay 166. This disparity is due to the pre-charge power contacts and main power contacts provided for typical SATA slidable connections that are redundant in transverse electrical connections, such as the connection between the data storage cartridge 12 and the cartridge dock 22 where the cartridge dock 22 is adapted to sequence electrical connection with the targets 160 electrically rather than mechanically. In one embodiment, the targets 160 include at least one target 160 corresponding to each of ground, power, and signal of the hard drive 32. In one example, at least eight targets 160 are included. More specifically, in one embodiment, the targets 160 include seven targets 160 corresponding to signal and at least one target 160 corresponding to power.

In one embodiment, the number of targets 160 corresponding to power is dependent upon the voltage required a particular power source. In one embodiment, the cartridge dock 22 only requires connection with two of the power connection terminals 132. A connection with a third power connection terminal 132 may be desired to utilize the SATA connector safety scheme for "hot-plugging" a hard disk drive 32 with the cartridge dock 22 or other connector. In one embodiment, a target 160 corresponding with the third power connection terminal 132 is included even where "hot-plugging" is not utilized with the cartridge dock 22. As such, in one embodiment, ten targets 160, not including ground target 161, are provided having seven of the targets 160 corresponding to the signal connection terminals 132 and three of the targets 160 corresponding to the power connection terminals 132.

Since, as described above, reliance on the number and spacing of the connection terminals 132 on the hard drive 32 is lessened (i.e., no one-to-one ratio of connection terminals 132 to targets 160 is required), additional latitude can be used in forming the targets 160. In particular, non-standard targets 160 can be utilized. For instance, the targets 160 can be specifically designed for a longer life span and for better wear properties than commercially available SATA connectors. For example, conventional SATA receptacle connectors generally provide only a flash coating of gold or other conductive material with a thickness of between 0.127 microns (5μ inches) and 0.381 microns (15μ inches). The targets 160 can be formed with a thicker layer of conductive material. In other embodiments, additional protection is applied to the targets 160 formed primarily of gold by backing the gold target 160 with copper. For instance, in one example, the targets 160 are formed by plating 0.3 micron (11.8μ inches) of gold over 2.5 micron (98 μ inches) of nickel over 35 micron (1,378μ inches) of copper. Other customized formations of the targets 160 will be apparent to those of skill in the art.

Figure 5A:
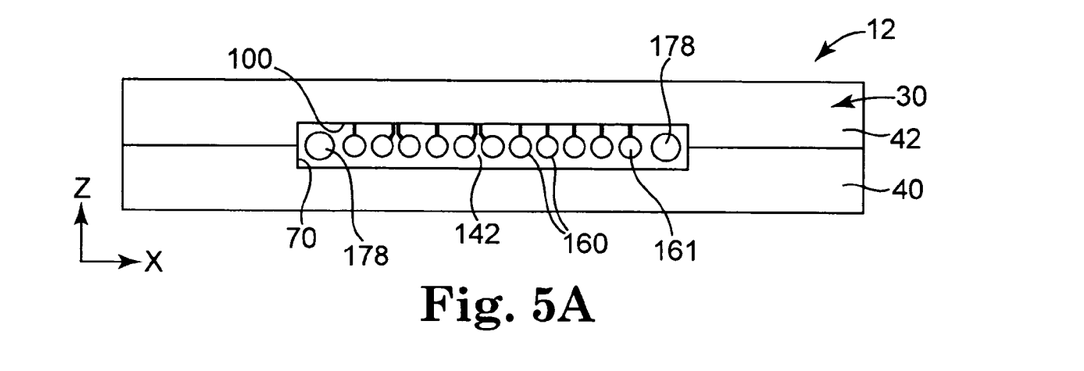
FIG. 5A is a front view illustration of one embodiment of the data storage cartridge of FIG. 2.
Figure 5B:
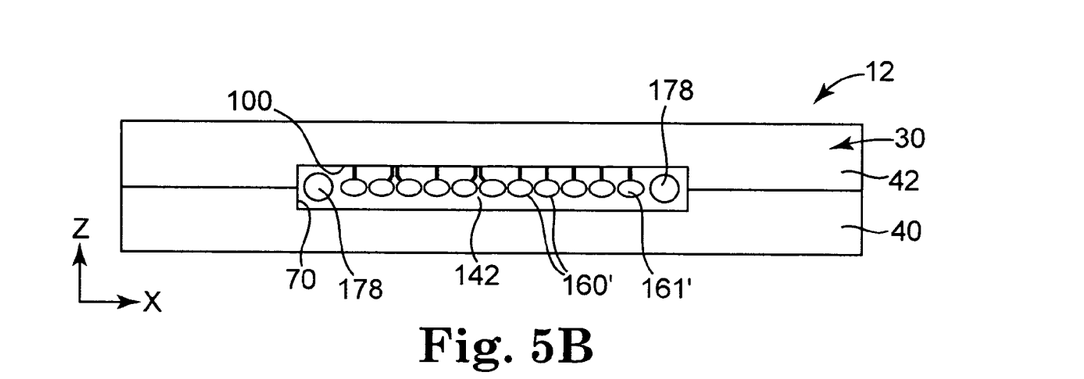
FIG. 5B is a front view illustration of one embodiment of a data storage cartridge.
Figure 5C:
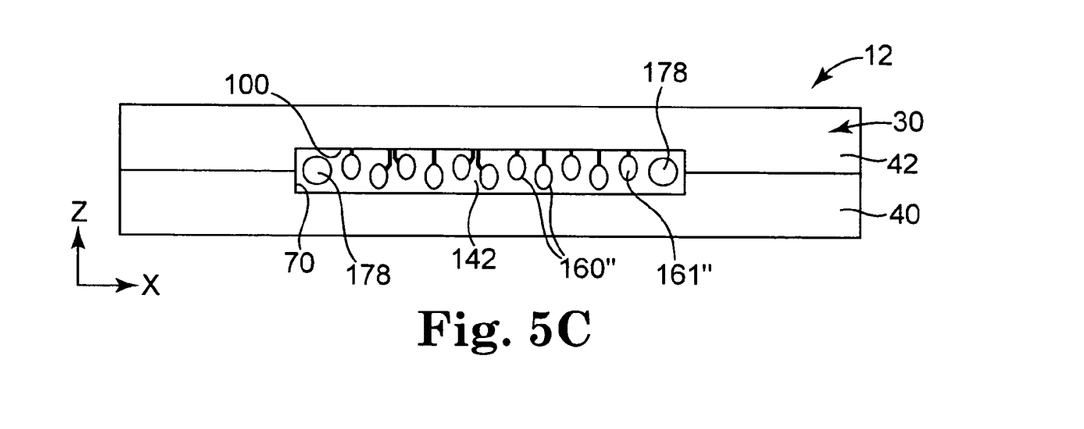
FIG. 5C is a front view illustration of one embodiment of a data storage cartridge.

As illustrated in FIGS. 3 and 5A, in one embodiment, the targets 160 and 161 are round, linearly arranged, and evenly spaced from one another. However, other shapes and arrangements of the targets 160 and 161 are contemplated. For example, as illustrated in FIG. 5B, where a relatively high mechanical tolerance for movement of the data storage cartridge 12 relative to the cartridge dock 22 is provided in the X-direction as compared to the Y-direction, alternative targets 160' and 161' may be elongated in the X-direction to permit precise and repeatable electrical connection under the mechanical tolerances provided by the cartridge dock 22 and/or cartridge 12. Similarly, as illustrated in FIG. 5C, a higher tolerance for interfacing with the cartridge dock 22 is provided in the Y-direction as compared to the X-direction, alternative targets 160" and 161" may be elongated in the Y-direction to permit electrical connection under the provided mechanical tolerances. Further, as illustrated in FIG. 5C, the targets 160" and 161" may be staggered or positioned in any, other non-linear array dependent upon the arrangement of the cartridge dock 22 connection members as will be further described below.

The shape, size, and spacing of the targets 160, 160', 160", 161, 161', and 161" are also dependent on the particular attributes of the cartridge dock 22 connection. In one embodiment, the targets 160, 160', 160", 161, 161', and 161" are sized to decrease the need for alignment structures within the cartridge dock 22. Other arrangements and configurations of the targets 160, 160', 160", 161, 161', and 161" will be apparent to those of skill in the art, for instance each target may be shaped differently, etc. Although primarily described below as with respect to the targets 160 and 161 of FIG. 5B, it should be understood that the targets 160', 160", 161', 161" or any other suitable targets may be substituted as deemed appropriate.

In one embodiment, the receptacle support substrate 144 is an elongated and substantially rigid material applied to the flexible circuit 142 near the first end 162 and opposite the receptacle 140 to provide additional support to the flexible circuit 142. The receptacle support substrate 144 defines a front surface 170 mechanically coupled with the flexible circuit 142 and a rear surface 172 opposite the front surface 170. In one example, the receptacle support substrate 144 is formed of FR4 (fire resistant) glass epoxy.

Similarly, the target support substrate 146 is elongated, substantially rigid, and extends across the second end 164 of the flexible circuit 142 on a surface opposite the targets 160. The target support substrate 146 defines a front surface 174 mechanically coupled with the flexible circuit 142 and a rear surface 176 opposite the front surface 174. The support substrates 144 and 146 may be formed of any suitable non-conductive material, such as a polyimide, a polyester, fiberglass, etc., configured to add additional rigidity and strength to the respective portion of the flexible circuit 142 without substantially impacting the electrical function of the flexible circuit 142. In one example, the target support substrate 146 is formed of FR4 (fire resistant) glass epoxy.

In one embodiment, the connection assembly 34 defines alignment holes 178 configured to facilitate positioning of the data storage cartridge 12 within a corresponding one of the cartridge docks 22 as will be further described below. In one example, each alignment hole 178 extends through flexible circuit 142 and the target support substrate 146 on either side of the array of targets 160 and 161. Collars or other supports may be defined in addition to or as an alternative to the alignment holes 178 to facilitate cartridge/dock alignment as will be apparent to those of skill in the art.

Referring once again to the embodiment illustrated in FIG. 2, during assembly, the hard drive 32 is coupled with the receptacle 140 of the connection assembly 34. More particularly, the receptacle 140 of the connection assembly 34 is mechanically and electrically coupled with the electrical data connector 130 of the hard drive 32. While electrically coupled to the connection assembly 34, the hard drive 32 is positioned within the base 40. In one example, the hard drive 32 is floated or flexibly mounted within the base 40. In other words, the hard drive 32 is mounted within the base 40 so as to allow for movement of the hard drive 32 relative to the base 40 and for shock and/or vibration absorption to protect the hard drive 32. In one instance, the hard drive 32 is flexibly mounted within the housing 30 using one or more shock insulators.

For example, shock insulators 180 and 182 are included in data storage cartridge 12 and each define a cavity 184 configured to receive at least a portion of the hard drive 32. In one embodiment, each shock insulator 180 and 182 fits over a side wall and portions of the leading and trailing walls 124 and 126 of the hard drive 32. Each shock insulator 180 and 182 is formed of any suitable shock absorbing/dampening material such as energy-absorbent foam (for example, CONFOR® foam available from E-A-R Specialty Composites of Indianapolis, Ind.) or any other suitable material.

After positioning shock insulators 180 and 182 relative to the hard drive 32, the hard drive 32 is positioned within the housing 30. In particular, the hard drive 32 is positioned in the base 40 with the electrical data connector 130 of the hard drive 32 facing the leading wall 52 of the base 40. The hard drive 32 and shock insulators 180 and 182 are sized to fit between the side walls 56 and 58 in the X-direction and between the trailing wall 54 and the stop flanges 80 and 82 in the Y-direction. In one embodiment, the shock insulators 180 and 182 tightly interact with the base 40, more particularly, with stop surfaces 84 and walls 54, 56, and 58, to maintain the position of the hard drive 32 by friction fit while generally preventing direct contact between the hard drive 32 and the base 40. As such, mechanical shock resulting from a dropped or otherwise impacted base 40 will be at least partially absorbed by the shock insulators 180 and 182 before being imparted to the hard drive 32.

After or as the hard drive 32 is positioned relative to the base 40, the connection assembly 34 is manipulated to position the targets 160 and 161 and alignment holes 178 to align with and face the cut-out 70. More specifically, in one embodiment, the flexible circuit 142 is folded or bent over itself such that the back surfaces 172 and 176 (FIGS. 3 and 4) of the support substrates 144 and 146 face one another. In one example, the target support substrate 146 is at least partially received by the stepped surface of the support tabs 72 and 74. As such, the target support substrate 146 is maintained between a portion of each support tab 72 and 74 and the leading wall 52 such that the targets 160 and 161 and alignment holes 178 are accessible from a position external to the data storage cartridge 12 through the cut-out 70. In one embodiment, the support substrate 146 may be adhered, screwed, or otherwise rigidly secured in place relative to the base 40. In this manner, the data storage cartridge 12 is flexibly mounted to the base 40 while the targets 160 are rigidly positioned relative to the base 40.

After positioning the hard drive 32 within the base 40, the cover 42 is coupled with the base 40. In particular, the cover 42 is placed over the base 40 such that the leading wall 94, the trailing wall 96, the first side wall 98, and the second side wall (not illustrated) of the cover 42 are each configured to respectively mate with the leading wall 52, the trailing wall 54, the first side wall 56, and the second side wall 58 of the base 40. As such, the cut-outs 70 and 100 align with each other to collectively form a connection window as illustrated with additional reference to the front view of FIG. 5A.

Further, due to similar features and size of the cover 42, in one embodiment, the shock insulators 180 and 182 frictionally fit within and interact with the cover 42 while the hard drive 32 generally does not directly contact the cover 42 in a similar manner as described with respect to the base 40. Coupling of the cover 42 to the base 40 further serves to capture and maintain the target support substrate 146 between leading walls 52 and 94 and tabs 72 and 74 and the corresponding tabs (not illustrated) in the cover 42. As such, in one embodiment, the targets 160 and 161 supported by target support substrate 146 are rigidly supported relative to the housing 30 of the data storage cartridge 12.

When the cover 42 is placed on base 40, the cylinder bodies 76 and 78 of the base 40 respectively coaxially align with the apertures 102 and 104 of the cover 42. A connection device (not illustrated) such as a screw, etc., is threaded through each aperture 102 and 104 and into the respective cylinder bodies 76 and 78 to secure the cover 42 to the base 40. Additionally or alternatively, the base 40 and the cover 42 are configured for a snap, friction-fit, or other suitable connection with one another.

In the described configuration, upon assembly, the hard drive 32 is fully enclosed within the housing 30 and is only electrically accessible via the plurality of targets 160, which in turn are externally accessible via the window collectively defined by cut-outs 70 and 100. As such, the targets 160 provide an interface for externally accessing the non-tape storage medium 110 of the hard drive 32. Notably, the targets 160 are rigidly maintained in a position relative to the housing 30 while the hard drive 32 is allowed to float within the housing 30 due to shock insulators 180 and 182 and the flexible circuit 142. Accordingly, the hard drive 32 is at least partially protected from shock while still providing the targets 160 in a predictably located position for being externally accessed. The rigid mounting of the targets 160 provides for more predictability in mating a cartridge dock 22 or other host system with the data storage cartridge 12 as will be further described below. In one embodiment, the ground target 161 and the alignment holes 178 are also externally accessible via the window collectively defined by cut-outs 70 and 100.

Figure 6:
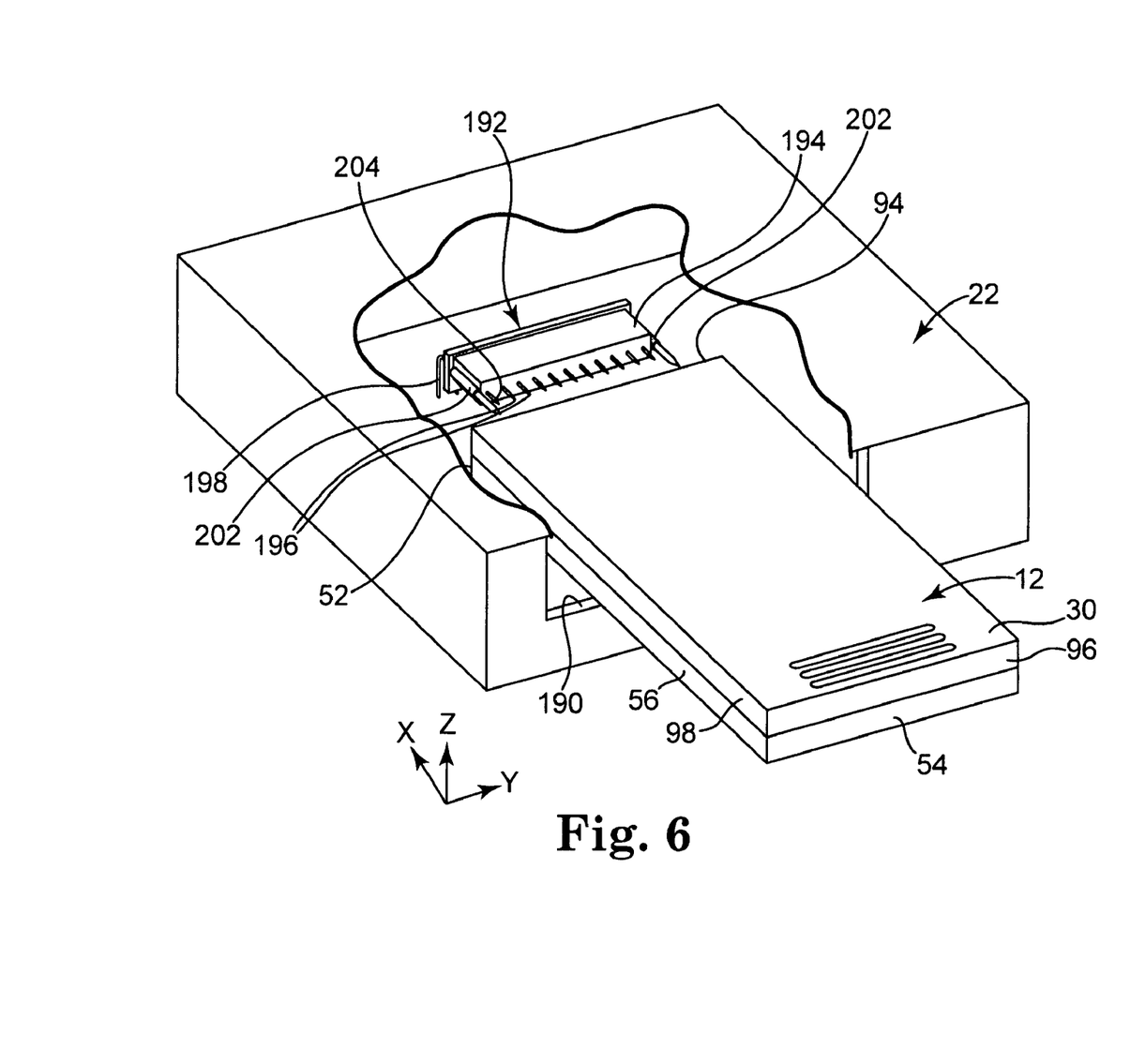
FIG. 6 is a perspective view schematic illustration of one embodiment of a data storage cartridge interfacing with a cartridge dock.

Referring to FIG. 6, the cartridge dock 22 is adapted to receive the data storage cartridge 12 and to read data from and/or write data to the hard drive 32 stored therein. In one embodiment, the cartridge dock 22 includes a cavity or socket 190 adapted to selectively receive the data storage cartridge 12. An electrical dock connector 192 is located within the cartridge dock 22 and is adapted to electronically access the hard drive 32 via the targets 160.

Figure 7:
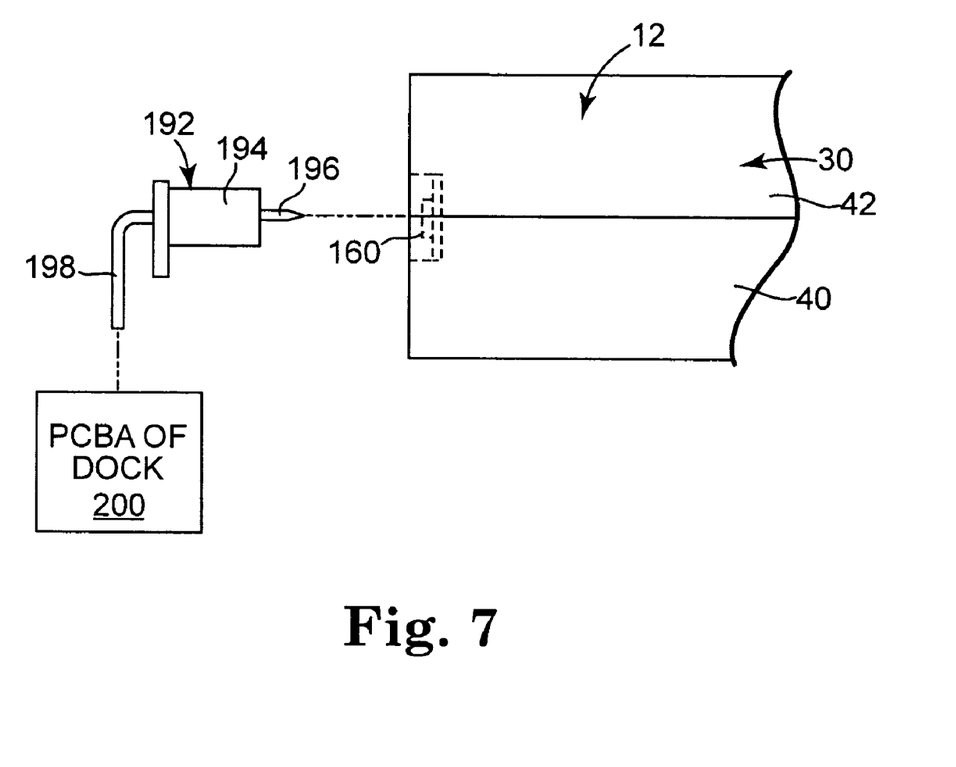
FIG. 7 is a schematic side view illustration of interaction between the cartridge dock and the data storage cartridge of FIG. 6.

Additionally referring to FIG. 7, in one embodiment, the dock connector 192 generally includes a mounting block 194, a plurality of compliant pins 196, and a plurality of electrical interconnects 198. In one example, the mounting block 194 is formed of any substantially rigid, nonconductive material and is a substantially rectangular block that at least partially receives each of the plurality of compliant pins 196. One example of a suitable compliant pin 196 is described in U.S. patent application Ser. No. 10/928,486 entitled "Electronic Data Connector of Data Storage Cartridge and Associated Cartridge Drive," which is hereby incorporated by reference.

As such, in one embodiment, each compliant pin 196 is coated with a conductive metal, such as gold, beryllium, copper, or tool steel, and defines a round or otherwise styled contact tip for compliantly contacting one of the plurality of targets 160. In one embodiment, each compliant pin 196 is a POGO® pin available from Everett Charles Technologies of Pomona, Calif. In one embodiment, each compliant pin 196 is configured to contact one of the targets 160 of the data storage cartridge 12 during use.

The number and arrangement of the compliant pins 196 is dependent upon the particular requirements of the cartridge dock 22 and the number and arrangement of the targets 160 of the data storage cartridge 12. In particular, each compliant pin 196 is configured to transversely contact one of the targets 160. For instance, where the data storage cartridge 12 includes ten linearly arranged targets 160 as illustrated in FIGS. 3 and 5A, the dock connector 192 includes ten complimentary, linearly arranged compliant pins 196. Accordingly, the size, spacing, and arrangement of the compliant pins 196 in the dock connector 192 can be altered as desired based not only on size and other constraints of the cartridge dock 22 itself, but also based on the size, spacing, and arrangement of the targets 160 and/or specific mechanical tolerances of the data storage cartridge 12 relative to the cartridge dock 22. Similarly, particulars of the targets 160 can be customized based on the specifics of the dock connector 192.

The electrical interconnects 198 are each in electrical communication with one of the plurality of compliant pins 196. Each of the electrical interconnects 198 extends from the mounting block 194 opposite the compliant pins 196 to interface with a printed circuit board assembly, which is schematically illustrated at 200 in FIG. 7, of the cartridge dock 22 for transmitting data between the hard drive 32 and the cartridge dock 22 as well as any computing device or host system member in communication with the cartridge dock 22.

In one embodiment, the compliant pins 196 include one compliant pin 204 configured to interface with the ground target 161 of the data storage cartridge 12 during use. The compliant pin 196 is configured to have a predetermined voltage level, such as five volts running therethrough. With this in mind, the printed circuit board assembly 200 is configured to monitor the voltage level on the compliant pin 196 to determine when the data storage cartridge 12 is in good electrical contact with the cartridge dock 22 as will be further described below.

In one example, the mounting block 194 defines one or more guide pins 202 configured to interface with the data storage cartridge 12 to facilitate alignment of the data storage cartridge 12 with the cartridge dock 22, more specifically, with the compliant pins 196 and 204. For instance, each guide pin 202 is tapered and configured to be at least partially inserted through one of the alignment holes 178 of the data storage cartridge 12 to grossly align the data storage cartridge 12 with the cartridge dock 22. Each guide pin 202 extends beyond the ends of the compliant pins 196 such that guide pins 202 will interface with the data storage cartridge 12 before the compliant pins 196.

During use, the data storage cartridge 12 is positioned with the leading walls 52 and 94 facing the socket 190 of the cartridge dock 22, and the data storage cartridge 12 is inserted into the socket 190 in the Y-direction. When fully inserted within the socket 190, the dock connector 192 and the targets 160 (FIG. 5A) are grossly aligned with one another for subsequent interaction. More particularly, each pin 154 interfaces with one of the drive connection terminals 132 as generally indicated in FIG. 2. In one embodiment, the dock connector 192 is positioned within the cartridge dock 22 such that movement of the data storage cartridge in the Y-direction positions the data storage cartridge 12 for electrical communication with the cartridge dock 22 without requiring substantial movement of the data storage cartridge 12 in the X-direction or the Z-direction. More specifically, the data storage cartridge 12 is moved along the Y-direction until each of the compliant pins 196 of the dock connector 192 contacts one of the targets 160 of the data storage cartridge 12. The single axis movement of the data storage cartridge 12 relative to the cartridge dock 22 simplifies the mechanical interaction required between the data storage cartridge 12 and the cartridge dock 22.

In one embodiment, alignment and electrical coupling of the data storage cartridge 12 with the cartridge dock 22 is facilitated by the alignment holes 178 of the data storage cartridge 12 and the guide pins 202 of the cartridge dock 22. In particular, when the data storage cartridge 12 is inserted into the cartridge dock 22, the guide pins 202 are configured to be received within the alignment holes 178 of the data storage cartridge 12. Since the guide pins 202 generally extend from mounting block 194 further than the compliant pins 196, the guide pins 202 interact with the data storage cartridge 12 first and grossly align the data storage cartridge 12, more particularly, the targets 160 and 161, relative to the compliant pins 196.

The compliant pins 196 transversely contact the targets 160 and 161. Otherwise stated, each of the tips of the compliant pins 196 approach and contact the respective one of the targets 160 in a manner substantially perpendicular to the overall extension of the respective target 160 on the flexible circuit 142. As such, the interaction between the compliant pins 196 and the targets 160 is characterized by a non-frictional or non-sliding interface. In one example, the target support substrate 146 prevents deformation of the flexible circuit 142 due to pressure from the compliant pins 196. In one embodiment, contact between the compliant pins 196 and the targets 160 and 161 at least partially compresses the compliant pins 196.

In one embodiment, the data storage cartridge 12 is continually inserted into the cartridge dock 22 until the voltage on the compliant pin 204 reaches zero. More specifically, as described above, the compliant pin 204 is configured to align with the ground target 161 and is charged with a predetermined voltage. When the compliant pin 204 is in full contact with the ground target 161, the voltage on the compliant pin 204 is decreased to zero. As such, when the compliant pin 204 voltage is zero, the printed circuit board assembly 200, which is monitoring the voltage on the compliant pin 204, is notified that the data storage cartridge 12 is fully inserted into and in electrical contact with the cartridge dock 22. In one embodiment, the data storage cartridge 12 is not substantially inserted into the cartridge dock 22 any further after the voltage of the compliant pin 204 reaches zero.

The customized design of the targets 160 facilitates reliable interaction between the data storage cartridge 12 and the cartridge dock 22. For example, the transverse, non-sliding interface between the targets 160 of the data storage cartridge 12 and the compliant pins 196 of the cartridge dock 22 decreases degradation of the connection structures, thereby, increasing the reliability of the data storage cartridge 12 even after a plurality of connection/disconnection cycles. In addition, in some embodiments, the additional latitude provided in forming the non-standard targets 160 permits the targets 160 to be oversized to compensate for mechanical interaction tolerances between the data storage cartridge 12 and the cartridge dock 22. In one embodiment, the design of the targets 160 decreases the need for other alignment structures on the data storage cartridge 12 and/or the cartridge dock 22. Such sizing also permits more reliable blind or mechanical mating of the data storage cartridge 12 and the cartridge dock 22 where a human is not available to slightly move the data storage cartridge 12 relative to the cartridge dock 22 to initiate coupling. Such blind mating is of increased importance in automated library systems.

Figure 8:
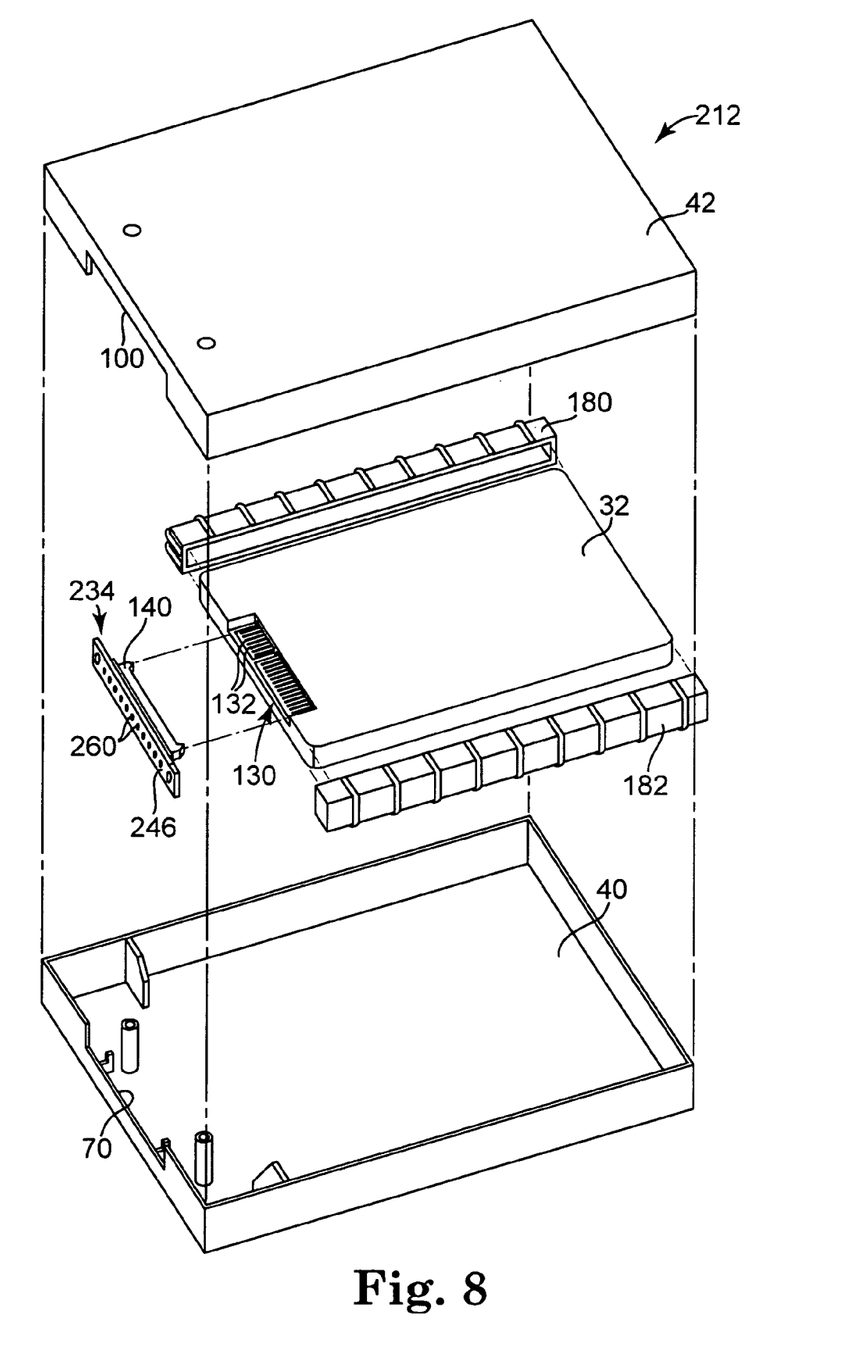
FIG. 8 is a perspective, exploded view illustration of one embodiment of a data storage cartridge.

FIG. 8 illustrates another embodiment of a data storage cartridge at 212. Data storage cartridge 212 is similar to data storage cartridge 12 described above except where specifically enumerated herein. In particular, data storage cartridge 212 includes a base 40, a cover 42, a hard drive 32, and insulators similar to the corresponding components of the data storage cartridge 12. The data storage cartridge 212 additionally includes a connection assembly 234. Similar to connection assembly 34 (FIGS. 1 and 3), the connection assembly 234 includes a receptacle 140. However, rather than being coupled to a flexible circuit, the receptacle 140 is directly coupled with a rigid, dielectric support member 246 having a plurality of targets 260, similar to targets 160 formed directly thereon and in direct communication with electrical pins (not illustrated) of the receptacle 140. As such, connection assembly 234 provides for customizable targets 260 and provides at least some of the benefits described above with respect to the connection assembly 34 of the data storage cartridge 12. In one example, replacing the connection assembly 34 with the connection assembly 234 allows the base 40 and cover 42 to be shortened or otherwise simplified as will be apparent to those of skill in the art.

An electrical connection between the data storage cartridge and the cartridge dock or other host system according to the embodiments described above provides for a non-sliding, transverse electrical connection between the customized targets of the data storage cartridge with respect to the cartridge dock or other host system. The transverse interface between the compliant pins of the cartridge dock and the targets of the data storage cartridge decreases excessive scraping or other degradation of the connection, thereby, decreasing wear of and increasing the life span of the cartridge electrical connection. Accordingly, the integrity of the connection of the cartridge dock with a data storage cartridge is improved over repeated connection and disconnection cycles. As a result, the life span of each data storage cartridge is increased.

In addition, by providing the connection assembly of the data storage cartridge rather than directly using the electrical connection of the hard drive itself for repeated connection and disconnection, the target contacts can be numbered, sized, shaped, spaced, etc., as desired for particular applications in order to increase the reliability and integrity of connections under various mechanical tolerances. Such target contact customization is especially useful in designing cartridges for use in automated library systems that do not utilize a human touch in placement of data storage cartridges within the cartridge read/write docks. Still further, the customization of the target contacts also permits materials and constructions to be used in forming the targets not otherwise available in convention electrical connections provided in hard drives.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A data storage cartridge comprising:
   a housing;
   a non-tape storage medium stored within the housing;
   an electrical data connector stored within the housing and configured to provide electrical access to the non-tape storage medium, wherein the electrical data connector includes a first number of connection terminals; and
   a connection assembly positioned within a window formed in a leading wall of the housing, coupled with the electrical data connector, and including a second number of electrical targets spaced from and in electrical communication with the electrical data connector, wherein the first number is greater than the second number, and the electrical targets comprise a substantially flat connection surface comprising metallized pads attached to a film that is retained in the window of the housing, and further wherein external access to the storage medium is provided via electrical contact with the substantially flat surface.

2. The data storage cartridge of claim 1, wherein the electrical data connector is a Serial Advanced Technology Attachment (SATA) connector.

3. The data storage cartridge of claim 1, wherein the connection assembly includes a receptacle coupled to the electrical data connector.

4. The data storage cartridge of claim 3, wherein the connection assembly includes a flexible circuit having a first end electrically coupled with the receptacle and a second end opposite the first end, the second end including the electrical targets.

5. The data storage cartridge of claim 1, wherein each of the electrical targets is substantially planar and extends substantially perpendicular to an extension of the connection terminals.

6. The data storage cartridge of claim 1, wherein the first number of connection terminals is more than twenty and the second number of electrical targets is less than fifteen.

7. The data storage cartridge of claim 1, wherein the connection assembly further includes a ground target in addition to the second number of electrical targets.

8. The data storage cartridge of claim 7, wherein the electrical targets include at least one target for each of power, ground, and signal communication with the electrical data connector.

9. The data storage cartridge of claim 1, wherein the housing defines a leading wall having an access window and a trailing wall opposite the leading wall, the electrical data connector being positioned within the housing relatively near the leading wall as compared to the trailing wall, and further wherein the electrical targets are externally accessible through the access window.

10. The data storage cartridge of claim 1, wherein each electrical target is in electrical communication with a single one of the connection terminals of the electrical data connector.

11. The data storage cartridge of claim 1, further comprising at least one shock insulator configured to flexibly mount the non-tape storage medium within the housing and wherein the electrical targets are rigidly positioned relative to the housing.

12. The data storage cartridge of claim 11, wherein the connection assembly includes at least one alignment hole configured to grossly align the data storage cartridge with a cartridge dock.

13. The data storage cartridge of claim 1, further comprising a hard drive including the non-tape storage medium and the electrical data connector.

14. The data storage cartridge of claim 1, wherein the non-tape storage medium includes a solid-state storage medium.

15. A cartridge dock for interfacing with a data storage cartridge including a non-tape storage medium in communication with a plurality of connection terminals, and electrical connection targets in electrical communication with at least a portion of the plurality of connection terminals, the cartridge dock comprising:
   a socket configured to at least partially receive the data storage cartridge; and
   a dock connector positioned within the socket and including a number of conductive and compliant pins each configured to contact a corresponding one of the electrical connection targets, wherein the number of conductive and compliant pins is less than a number of connection terminals included in the electrical connector and each electrical connection target comprises a flat metallized target that is wider than a width of any one of the complaint pins and so configured to provide electrical connection between the electrical connection targets and the compliant pins.

16. The cartridge dock of claim 15, wherein the electrical connector is a SATA connector, and the number of conductive and compliant pins is less than twenty-two.

17. The cartridge dock of claim 16, wherein the number of conductive and compliant pins is fifteen or less.

18. The cartridge dock of claim 15, wherein at least one of the number of conductive and compliant pins is assigned to power, at least one of the number of conductive and compliant pins is assigned to ground, and at least one of the number of conductive and compliant pins is assigned to electrical signal.

19. The cartridge dock of claim 18, wherein the dock connector is coupled with a printed circuit board assembly sequenced to electrically communicate with the at least one conductive and compliant pin relating to ground prior to the at least one conductive and compliant pin relating to power or the at least one conductive and compliant pin relating to electrical signal.

20. The cartridge dock of claim 19, wherein each of the conductive and compliant pins is configured to transversely contact one of the flat metallized targets at any location across a width of the flat metallized target.

21. The cartridge dock of claim 15, wherein the dock connector includes at least one guide pin configured to interface with the data storage cartridge to facilitate alignment of the electrical connector of the data storage cartridge with the conductive and compliant pins.

22. A data storage system comprising:
   a data storage cartridge including:
      a housing enclosing a non-tape storage medium and a data connector configured to provide electrical access to the non-tape storage medium, wherein the data connector includes a first number of connection terminals, and
      a connection assembly positioned within the housing, coupled with the electrical data connector, and including a second number of flat electrical targets spaced from and in electrical communication with the electrical data connector, each flat electrical target comprising a metallized pad disposed on a film; and
   a cartridge dock including:
      a socket configured to at least partially receive the data storage cartridge, a dock connector positioned within the socket and including a third number of conductive and compliant pins each configured to contact a corresponding one of the flat electrical targets at a location within an area of the metallized pad to externally access the storage medium via the connection assembly and the data connector;

wherein the third number is equal to the second number and is less than the first number.

23. The cartridge dock of claim 15, wherein each compliant pin is configured to transversely contact a corresponding one of the electrical connection targets along a non-sliding interface.

24. The cartridge dock of claim 15, wherein the electrical connection targets comprise a substantially planar interface disposed parallel with a leading wall of the data storage cartridge.

25. The data storage system of claim 22, wherein the connection assembly is disposed within a window formed in a leading wall of the housing, the electrical targets positioned in the window substantially parallel with the leading wall such that the conductive and compliant pins butt into contact with a corresponding one of the electrical targets.

* * * * *